Sept. 23, 1924.
C. E. STARR
1,509,498
TRANSMISSION MECHANISM
Filed July 20, 1922
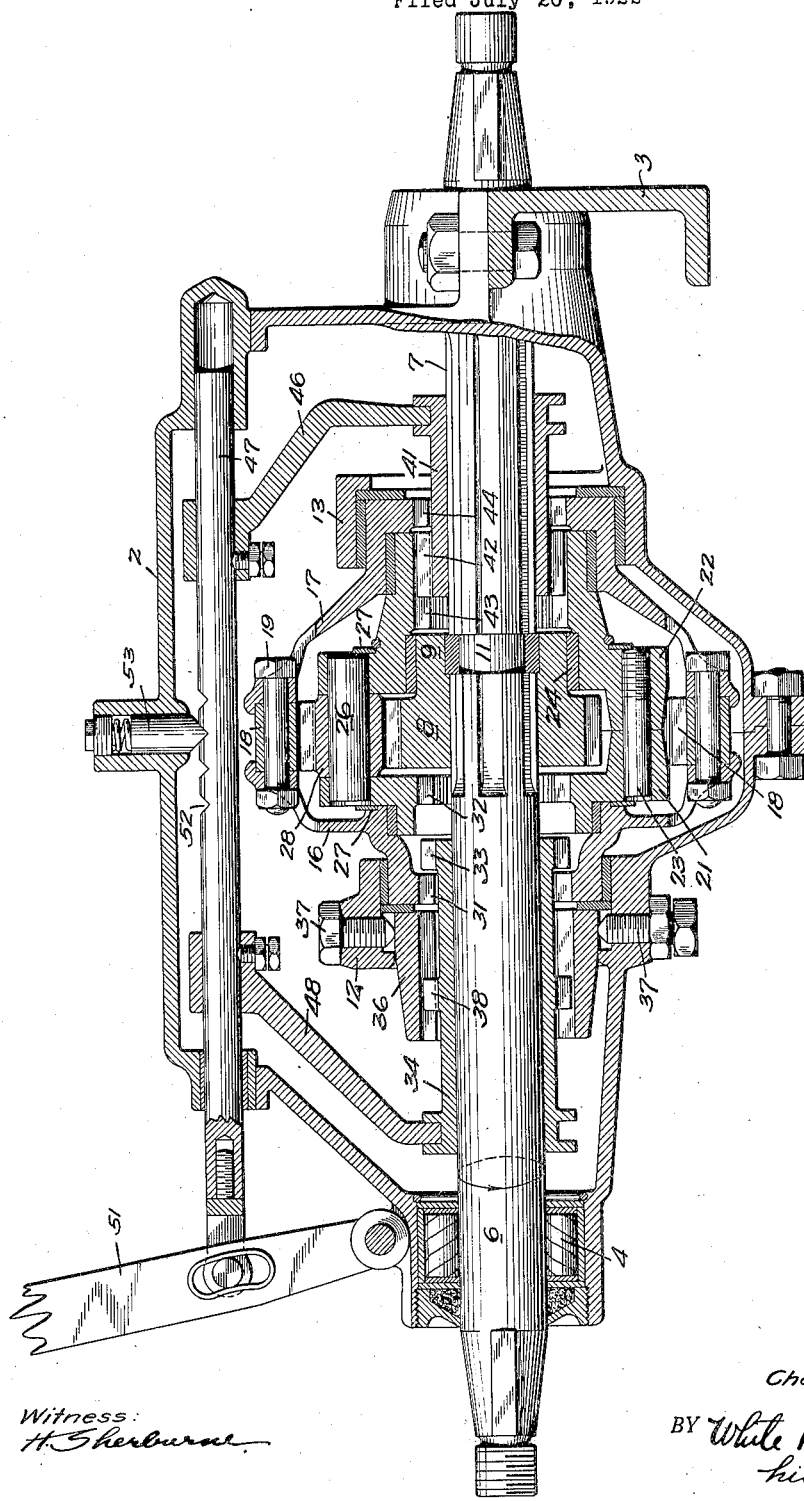
INVENTOR.
Charles E. Starr.
BY *White Prost Evans*
his ATTORNEYS.
Witness:
H. Sherburne Patented Sept. 23, 1924.

1,509,498

UNITED STATES PATENT OFFICE.

CHARLES E. STARR, OF OAKLAND, CALIFORNIA, ASSIGNOR TO PERFECTO GEAR DIFFERENTIAL CO., OF SEATTLE, WASHINGTON, A CORPORATION OF WASHINGTON.

TRANSMISSION MECHANISM.

Application filed July 20, 1922. Serial No. 576,266.

*To all whom it may concern:*

Be it known that I, CHARLES E. STARR, a citizen of the United States of America, and a resident of Oakland, county of Alameda, and State of California, have invented a new and useful Transmission Mechanism, of which the following is a specification.

My invention relates to transmission mechanisms for motor driven vehicles, and particularly to a transmission mechanism especially suitable for use with the combination transmission and differential device which is the subject of my copending application, Serial Number 559,182, filed May 8, 1922.

One of the objects of the invention is the provision of a speed change mechanism capable of providing two forward and one reverse speed and characterized by quietness in operation and by compactness and simplicity of construction. Another object of the invention is the provision of a speed change mechanism in which the gears are always in mesh, and the several combinations are secured by the engagement and release of two positive clutch members.

My invention possesses other objects and features of advantage, some of which, with the foregoing, will be set forth in the following description of my invention. It is to be understood that I do not limit myself to the showing made by the said description, as I may adopt variant forms of my invention within the scope of the claims.

The figure of the drawing is a vertical sectional view taken longitudinally thru the transmission mechanism.

In terms of broad inclusion, my transmission mechanism comprises alined driven and driving shafts with a planetary gear system interposed between the two shafts. The center gear of the planetary system is fixed for rotation with the driving shaft, and means are provided for connecting either the planetary gear mounting or the ring gear of the system with a fixed element which comprises a housing enclosing the entire mechanism, or for connecting either the planetary gear mounting or ring gear, or both together, with the driven shaft. When both ring gear and planet gear mounting are connected together for rotation with the driven shaft, the entire mechanism revolves as a unit at driving shaft or engine speed. When the planet gear mounting is held against rotation the planet gears act as jackshaft gears to drive the ring gear in reverse direction, the ring gear at this time being connected for rotation with the driven shaft. When the ring gear is held stationary the planet gear mounting is connected for rotation with the driven shaft, and the planet gear planetates about the ring gear, driving the driven shaft forwardly at low speed. A neutral point is provided in which there is no driving connection between the two shafts.

In detail the transmission mechanism of my invention comprises a housing 2 adapted to be supported on the frame of the machine by cross members 3, one of which is shown at the right of the figure. Arranged in suitable bearings 4 are the alined driving shaft 6 and driven shaft 7, each having its outer end suitably formed to fit a universal coupling in accordance with well known practice, the shaft 6 being connected to the engine shaft and the shaft 7 to the shaft extending to the driving pinion in the rear axle housing. Splined on the inner end of the driving shaft 6, is a center gear 8 having a hub 9, which is bushed to provide a bearing for the reduced end 11 of the driven shaft 7, so that proper alinement is maintained.

Within the housing 2 and formed preferably integral therewith are bearing bridges or blocks 12 and 13, one on either side of the center gear 8. Journaled in these bearing bridges in suitable bearing bushings and disks, is a ring gear casing comprising two cup-like members 16 and 17, journaled respectively in the bridges 12 and 13, and carrying between them the ring gear 18, to which they are secured by bolts 19.

Journaled within the ring gear casing on suitable bearing bushings, and enclosing the center gear is the planet gear mounting or frame comprising the members 21 and 22 connected by studs 23, threaded into the member 22. An additional bearing bushing 24 is interposed between the gear mounting and the hub 9 to provide additional stability and assurance of proper alinement. Journaled on pins 26 held in the planet gear mounting by retaining rings 27, disposed on each side thereof, are the planet gears 28, which are in mesh with both the ring gear 18 and the center gear 8 at all times.

The outer end of the member 16 of the ring gear casing is provided with inwardly extending teeth 31 conveniently formed in the shape of gear teeth and comprising clutch members. Similarly inwardly projecting teeth 32 are formed on the member 21 of the planet gear mounting. These clutch members are adapted to be engaged by complementary teeth 33, formed on the inner end of a sleeve 34, which is slidably mounted in a ring 36 rigidly held in the bridge 12 by means of screws 37. Teeth 38 on the sleeve 34 in engagement with complementary teeth formed on the ring 36 prevent rotation of the sleeve 34 while permitting free longitudinal movement. Splined on the inner end of the driven shaft 7 is a similar sleeve 41 having wide teeth 42 formed thereon adapted to be engaged with complementary teeth 43 on the gear mounting member 22 and complementary teeth 44 on the ring gear casing member 17. A yoke 46 having arms engaged in an annular groove in the sleeve 41 is fixed on a rod 47 slidably arranged in the housing 2 and a similar arm 48 connects the rod 47 with the sleeve 34 so that the two sleeves are moved together as one, by movement of the rod 47.

The spacing and size of the various clutch members is illustrated in the drawing and is such that when the teeth 33 are in engagement with the teeth 31, the teeth 42 are in engagement with the teeth 43; and as the teeth 42 enter into engagement with the teeth 44, both teeth 31 and 32 are free of engagement with teeth 33, but when the teeth 42 are out of engagement with teeth 43 and fully in engagement with teeth 44, then teeth 33 are in engagement with teeth 32. When the teeth 42 are in full engagement with both teeth 43 and 44, teeth 31 and 32 are still free of teeth 33.

The rod 47 is moved to effect the various combinations by means of a manually operated lever 51 pivotally mounted on the housing 2 and pivotally connected to the rod. The rod is provided with a series of notches 52 adapted to be engaged by a spring-pressed pin 53 so that the rod is resiliently held in adjusted position. In the position of the parts shown in the figure the sleeves are in neutral position and rotation of the driving shaft 6 in the direction of the arrow will merely cause idling, in a reverse direction, of the ring gear 18. If the lever 51 is moved to slide the sleeves 34 and 41 one step to the left, clutch members 33 are engaged with clutch members 31 to hold the ring gear from rotation. The same movement leaves the teeth 42 in engagement with the teeth 43 so that the planet gear mounting is fixed for rotation with the driven shaft 7. With the parts so connected rotation of the shaft 6 will effect the planetation of the planet gears 28 about the interior of the ring gear, thus driving the planet gear mounting and the connected driven shaft at low speed. High speed is secured by movement of the lever 51 to the right (of the figure) so as to engage the clutch members 42 with the clutch members 44, without disengaging from the clutch members 43, that is to say, so that the planet gear mounting and ring gear casing are connected together for rotation with the driven shaft 7. In this position the teeth 33 are close to but not engaging with the teeth 32. With the ring gear casing and planet gear mounting locked together, the planet gears cannot rotate and rotation of the shaft 6 effects a turning of the entire mechanism as a single unit in the direction of the arrow, that is at engine speed in a forward direction.

To reverse the direction of the driven shaft 7 the lever 51 is pulled to its extreme position to the right (of the figure). This engages clutch members 33 with clutch members 32 thus preventing the rotation of the planet gear mounting, and frees clutch members 42 from clutch members 43, engaging them with clutch members 44, so that the ring gear casing is now connected for rotation with the driven shaft. In this position of parts the planet gears do not function as such but as jackshaft gears, driving the ring gear in a direction opposite to the direction of the center gear 8.

It will be noticed that the operative gears are always in mesh and for this reason and because of the character of gears used, that is to say, ring, center and intermediate gears, the operation of the mechanism is very quiet.

I contemplate the use of the above described transmission either as an independent unit in cars in which two speeds and reverse is a suitable transmission, or as an adjunct to the transmission explained in my above-mentioned copending application. When so used it provides not only a reversing gear for such mechanism but also an additional low speed so that by the use of the two devices, six forward speeds and three speeds in reverse are secured.

I claim:

1. A transmission system comprising a driving and a driven shaft, a center gear fixed for rotation with said driving shaft, a ring gear journaled concentric with said driven shaft, a gear mounting journaled concentric with said driven shaft, a planet gear journaled on said mounting and in mesh with said ring and center gears, a fixed element, a sleeve slidably non-rotatably engaged with said fixed element and optionally engageable with said ring gear or said gear mounting, a sleeve slidably engaged with said driven shaft for rotation therewith and optionally engageable with either or both said gear mounting and ring gear, and means for moving said sleeves.

2. A transmission system comprising a driving and a driven shaft, a center gear fixed for rotation with said driving shaft, a ring gear journaled concentric with said driven shaft, a gear mounting journaled concentric with said driven shaft, a planet gear journaled on said mounting and in mesh with said ring and center gears, a fixed element, a sleeve slidably non-rotatably engaged with said fixed element and engageable with said ring gear and said gear mounting, a sleeve slidably engaged with said driven shaft for rotation therewith and engageable with said gear mounting and said ring gear, and unitary means for selectively shifting said sleeves to effect the following combinations: low speed; locking of said ring gear to said fixed element and said gear mounting to said driven shaft; neutral; locking said gear mounting to said driven shaft and freeing the ring gear; high speed; locking both gear mounting and ring gear to said driven shaft; reverse; locking said gear mounting to said fixed element and said ring gear to said driven shaft.

3. A transmission system comprising a driving and a driven shaft, a center gear fixed for rotation with said driving shaft, a ring gear journaled concentric with said driven shaft a gear mounting journaled concentric with said driven shaft, a planet gear journaled on said mounting and in mesh with said ring and center gears, a fixed element, a sleeve slidably non-rotatably engaged with said fixed element and optionally engageable with said ring gear or said gear mounting, a sleeve slidably engaged with said driven shaft for rotation therewith, and optionally engageable with either or both said gear mounting and ring gear, a rod connected to both sleeves, spring pressed pin and notch means for retaining the rod in position, and a lever for moving said rod.

4. A transmission system comprising a housing, a driving and a driven shaft journaled in said housing, a center gear fixed for rotation with said driving shaft, a ring gear, a casing on which said ring gear is mounted journaled in said housing on both sides of said center gear, a planet gear in mesh with said center and ring gears, a frame for mounting said planet gear journaled in said casing on both sides of said center gear, means for locking either said casing or said frame to said housing, and means for locking either or both said casing or said frame to said driven shaft.

5. A transmission system comprising a housing, a driving and a driven shaft journaled in said housing, a center gear fixed for rotation with said driving shaft, a ring gear, a casing on which said ring gear is mounted journaled in said housing on both sides of said center gear, a planet gear in mesh with said center and ring gears, a frame for mounting said planet gear journaled in said casing on both sides of said center gear, clutch members on both sides of said casing and said frame, a sleeve slidably non-rotatably engaged with said housing, clutch members on said sleeve engageable with said casing and frame clutch members on one side, a second sleeve slidably engaged with said driven shaft for rotation therewith, clutch members on said second sleeve engageable with said casing and frame clutch members on the opposite side, and means for moving the said sleeves.

In testimony whereof, I have hereunto set my hand.

CHARLES E. STARR.